April 15, 1947.  C. A. ABLETT  2,418,859

ROLLER BEARING

Filed Nov. 14, 1945   2 Sheets-Sheet 1

Inventor,
C. A. Ablett
By
Young, Emery & Thompson
Attorneys

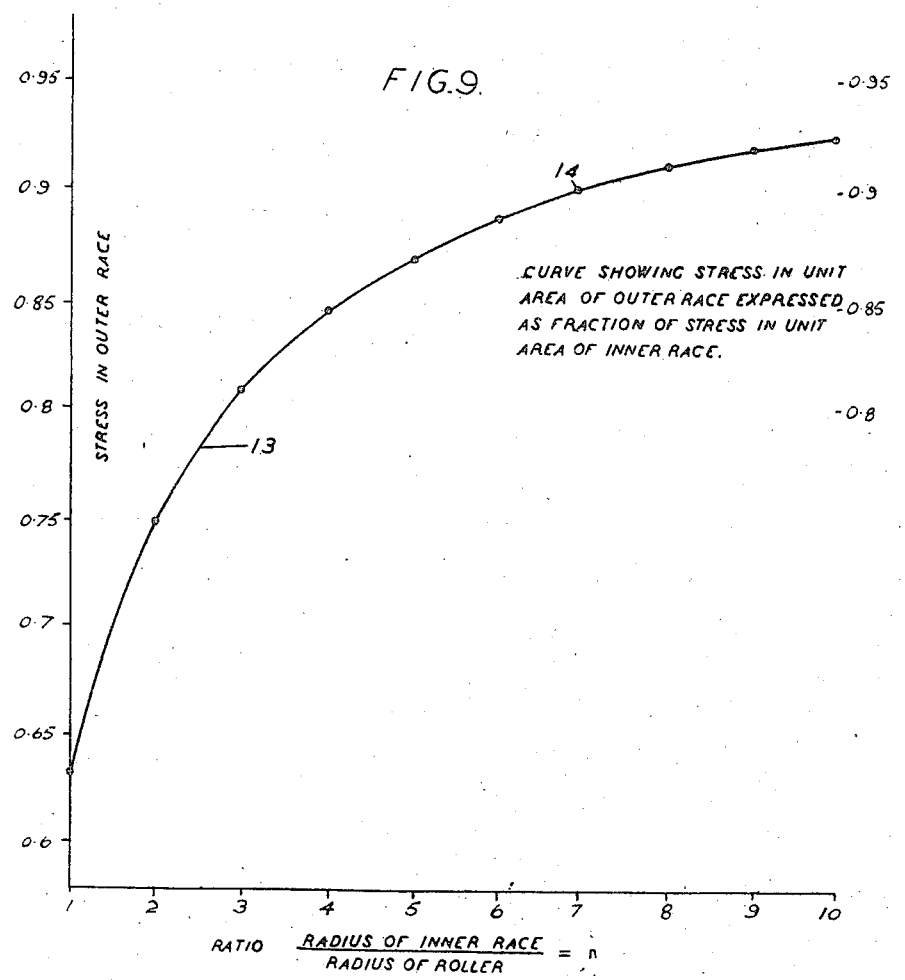

Patented Apr. 15, 1947

2,418,859

UNITED STATES PATENT OFFICE 2,418,859

ROLLER BEARING

Charles Antony Ablett, King's Lynn, England

Application November 14, 1945, Serial No. 628,597
In Great Britain November 13, 1944

4 Claims. (Cl. 308—213)

This invention relates to roller bearings, and more particularly to bearings in which a plurality of rollers are interposed between co-axial inner and outer races. When such bearings are under load, the load forces are transmitted through the rollers from one race to the other, and one of the difficulties which arise is that of ensuring that the rollers are in a state of equilibrium under load, and will not tend to twist or rotate spirally.

An object of the present invention is the provision of an improved construction in which such tendencies are eliminated or reduced to a minimum, and the rollers are maintained in a state of equilibrium or nearly so, under all load conditions. Other objects of the invention comprise the provision of improved combinations and details of construction, as will more fully appear hereinafter.

In the usual practice, the races are of equal length, that is, the dimension parallel to the axis, and the instability and tendency of the rollers to twist, encountered in such practice, is caused by the fact that they bear on the outer, convex, surface of the inner race, and on the inner concave surface of the outer race. Each roller bears against its two races along strips of surface which widen as load is applied to the bearing but which are always wider at the outer than at the inner bearing of the roller. For example, with a bearing for a 5 inch shaft lightly loaded, the width of the contact strip on the inner race is 0.0154 inch and the width of that on the outer race is 0.01732 inch. Since the load pressure is transmitted through the rollers from one race to the other, and therefore through a larger contact area at the outer race than at the inner, when the two contact strips are of equal length, parallel to the rollers, as is usual, it follows that the pressure applied per unit area of the outer race is normally less than the pressure applied per unit area of the inner race.

Under such conditions, the roller will be in a state of unstable equilibrium with respect to the inner race and will tend to twist itself. This is for the reason that the roller is under no tendency to twist so long as there are only forces acting on the roller in the radial plane, the roller tending to twist whenever there are unbalanced tangential forces acting between the inner race and the roller. It is evident that under the conditions above discussed, the forces acting on the roller from the inner race tending to upset its balance will be greater than any forces acting at an angle to the radial plane from the outer race which would tend to restore its balance, and such upsetting forces constantly occur when a bearing is in use.

I have discovered that the desired stability of the rollers can be secured and their tendency to twist counteracted by sufficiently reducing the effective roller bearing surface of the outer race relatively to that of the inner race, this resulting in the force transmitted per unit area of contact between the outer race and each roller being increased. This as I have now discovered can be accomplished readily by making the effective bearing surface length of the outer race less than that of the inner race in any suitable way so that, generally speaking the force transmitted at any moment, per unit of length of effective bearing, between the outer race and a roller, shall be at least approximately equal to, and preferably greater than, the force simultaneously transmitted per unit of length, between the same roller and the inner race. For the best results recourse may be had to certain calculations hereinafter explained. It appears that the effective bearing surfaces at the outer and inner races should be so adjusted relatively to each other in area (as by adjustment in length), that the force exerted per unit area (e. g. per unit length) by the roller on the outer race shall be at least equal to and preferably be greater, than the force exerted per unit area (e. g. per unit length) by the roller on the inner race. This is for the reason that the upsetting forces which act at an angle through the inner race on the roller will be counterbalanced or more than counterbalanced by the angularly acting restoring forces exerted from the outer race to the roller. From this it can be calculated that the square of the stress per unit area acting on the outer race must be at least equal to, and preferably be greater than, the square of the stress per unit area acting at the same time on the inner race; the relative lengths of bearing are inversely proportioned to the square of the stresses per unit area of each, so that the suitable lengths can readily be ascertained.

In order that the invention may be more readily understood attention is hereby directed to the accompanying drawings, forming part of this specification and illustrating certain embodiments of the invention. In the drawings.

Figure 6:
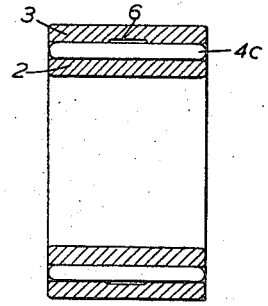
Figure 7:
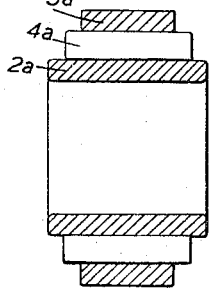
Figure 8:
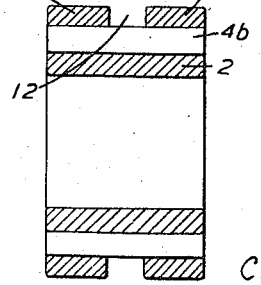

Figs. 6, 7 and 8 are vertical sections taken through other alternative forms of construction, applied to bearings split or solid having rollers of the needle or elongated varieties, and Fig. 9 is a graph showing the relation between the stresses per unit area of the inner and outer races of a bearing having races of equal length, in the axial direction for different ratios of radius of inner race to radius of roller, the stress per unit area in the inner race being considered as unity.

Figure 1:
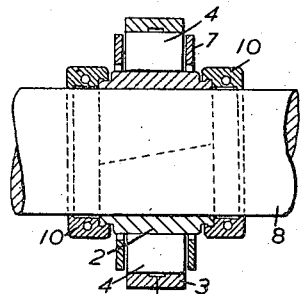
Fig. 1 is a vertical section through a split roller bearing embodying one form of the invention, the shaft being shown in elevation.
Figure 1A:
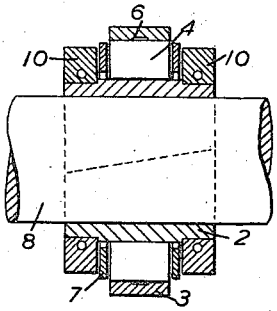
Figure 2:
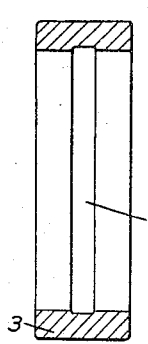
Fig. 2 is an enlarged vertical section of the outer race shown in Fig. 1.

Referring to the construction shown in Figs. 1 and 2, a roller bearing of the split or divided variety is shown as provided with a hardened steel inner race 2, a hardened steel outer race 3, and a series of hardened steel rollers 4, interposed therebetween. The outer race 3, is shown provided with an annular groove 6, intermediate its ends, which may be formed in any suitable way, as by machining or grinding. The width of this groove is suitably calculated so as to reduce the length of the roller-bearing-surface of the outer race, that is, its dimension in the axial direction of the rollers and the shaft, to reduce the effective bearing surface of the outer race relatively to that of the inner race, in accordance with the principles which have been indicated.

Figure 4:
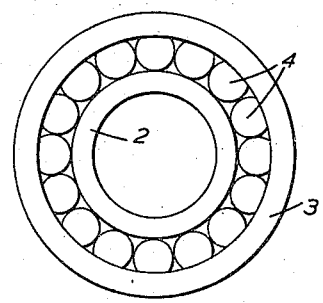
Fig. 4 is an end elevation of the bearing shown in Fig. 3.

As shown in Fig. 1 the rollers may be carried by a roller-bearing cage 7, which however can be dispensed with in many instances. The fact that the rollers are maintained in stable equilibrium, in a properly designed bearing in accordance with my invention, enables the annular spaces between the two races to be filled with rollers, thus enabling the bearing to carry a greater load than is usual in present practice; or, alternatively, as is shown for example in Fig. 4, smaller rollers may be used than is usual.

Figure 3:
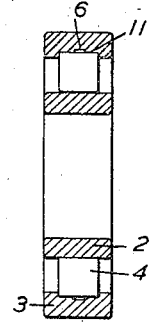
Fig. 3 is a similar section through an alterna-

Other details of construction are indicated in the various figures, 1 to 8. The invention may be applied either to split or to solid bearings. In case a split inner race is used, it may be secured in position on the shaft 8, in any suitable manner, as by the aid of split steel clamping rings 10, as is indicated in Fig. 1. In instances, in which the bearing is required to take up end thrust, or where the rollers must be prevented from moving longitudinally with respect to the outer race, the latter may be grooved to accommodate the rollers, as is shown at 11 in Fig. 3 in which case the groove 6, previously described, may be formed in the bottom of such groove, and positioned either symmetrically or unsymmetrically therein.

The reduction in the effective bearing surface of the outer race may of course be provided in other ways than by forming a groove such as the groove 6, previously described, therein. Thus, as is shown in Fig. 7, the outer race 3a may, in some instances, be given an overall length, that is, the dimension in the axial direction, which is less than the overall length of the inner race 2a, the ends of the rollers 4a, extending or projecting beyond the ends of the outer race. Alternatively, the effective length of the bearing surface of the outer race may be reduced as required by forming this race so that it is made up of two or more elements, such as the outer race elements 3b, 3c as shown in Fig. 8 arranged side by side about the rollers 4b, with a suitably dimensioned gap therebetween, such as the gap 12, shown in Fig. 8. Whatever the construction, it is only necessary that the outer race be reduced relatively to the inner race the required amount, in effective length or effective bearing surface.

Figure 5:
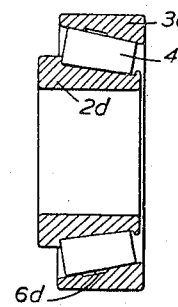
Fig. 5 is a vertical section through an alternative form of construction embodying a tapered roller bearing.

In Fig. 6 the invention is shown as applied to a roller-bearing containing rollers, such as the roller 4c, the effective length of the outer race 3, being reduced by the provision of a groove 6, similar to that previously described. The invention may also be applied to bearings provided with races or rollers which are coned or tapered in form. Such a construction is shown in Fig. 5 in which the rollers 4d, are slightly tapered and are interposed between a coned inner race 2d, and a coned outer race 3d, the latter being provided with a groove 6d, in its inner surface, which may be unsymmetrically positioned, as shown, this groove being of a width designed to reduce the effective roller-bearing-surface of the outer race, as above described.

It will be appreciated that in constructions in which the shaft or axle is required to be free to move longitudinally through the bearing, provision should, if the bearing surface of the outer race is grooved or recessed as above described, be made for enabling such movement to take place between the inner race and the roller and so that the latter is not displaced in regard to the outer race unless the construction is one in which the outer race is of a length, i. e., dimension parallel to the axis, which is greater than the length of the roller. For the purpose of locating the roller in regard to the outer race, any suitable arrangements may be provided, as for example, by providing the outer race with inwardly extending lips or ledges at its side edges.

To now discuss the theory underlying the invention a little more fully, where the length of the contact between a roller and a race is the same for both races, the average force on the contact strip between a roller and the inner race, per unit area, is always greater than the average force on the contact strip between the said roller and the outer race, which is the same as saying that the force transmitted at any moment between a roller and the inner race, per unit of area, is always greater than the force simultaneously transmitted between the roller and the outer race, per unit of area. The roller is therefore unstable. Such force on the outer contact strip can however, be made greater than the force on the inner contact strip, by varying the relative bearing area, or lengths, of the two races, as has been described, and this in the practice of the present invention, is the general condition required to obtain stability of the roller.

To put the matter more exactly, as it appears, the roller is unstable when the force exerted per unit area by the roller on the inner race is greater than the force exerted per unit area on the outer race, as is always the case when the length of contact is the same for both races. Conversely, it appears that when the force exerted per unit area on the two races is the same, there will be no forces tending to twist the roller, and, more desirably, when the force per unit area on the outer race is greater than that done on the inner race, the forces then transmitted tend to hold the roller in stable position.

The force exerted by the roller on the inner race is proportional to the average stress (which will hereinafter be referred to as $O^1$) on the inner contact strip multiplied by the width (which will be hereinafter referred to as $a_1$) of the contact strip of the roller on the inner race when such force is transmitted.

Similarly, the force exerted by the roller on the outer race is proportional to the average stress (which will be hereinafter referred to as $O_2$) on the outer contact strip multiplied by the width (which will be hereinafter referred to as $a_2$) of the contact strip of the roller on the outer race when such force is transmitted. We can say, therefore, that to obtain equilibrium, the respective lengths of the contact strips in the two races must be so proportioned that $O_2 a_2$ is equal to or preferably greater than $O_1 a_1$.

Now it can readily be demonstrated that $a_1$, is proportional to $O_1$ and that $a_2$ is proportional to $O_2$, and therefore we may substitute for the above relation, $O_2{}^2$ must be equal to and preferably greater than $O_1{}^2$, as the condition for equilibrium. The effective lengths of the bearing strips which may be termed $L_1$ and $L_2$, will be inversely proportional to the squares of the respective unit stresses $O_1$ and $O_2$.

The relative stresses in the two races can be shown in the form of a graph, for the different relations between the diameters of rollers and inner races met in practice, when the lengths of the two contact strips are equal. This is indicated in Fig. 9 where the curve 13 shows the stress per unit area of the outer race expressed as a fraction of the stress per unit area in the inner race, such stress in the inner race being considered as unity, and corresponding stresses in the outer race being indicated as fractions. The curve 13, it will be seen varies in steepness for different ratios between the radius of the inner race and the radius of a roller, these ratios, for cases frequently met in practice, being indicated along the horizontal co-ordinate of the graph. It will therefore be seen for example, that when this ratio is 7, the average unit stress in the outer race is $\frac{9}{10}$ of that in the inner race, as is indicated by the point 14, on the curve 13. The square of 0.9 is 0.81, and it follows that the length in the axial direction (or effective bearing surface) of the outer race must be reduced sufficiently to bring up the square of the unit stress in the outer race from 0.81 to 1.0 or greater, or, what is the same thing, that the length of the inner race must be increased sufficiently to reduce the square of its unit stress to 0.81. This can readily be done from the knowledge that the two lengths are inversely proportional to the squares of the respective stresses.

What I claim is:

1. A roller bearing having co-axial inner and outer races and a series of rollers interposed therebetween, the effective bearing surface of the outer race being less than the effective bearing surface of the inner race to an extent such that the force momentarily transmitted per unit of area of effective bearing under load, parallel to said rollers, between the outer race and one of said rollers is greater than the force simultaneously transmitted per unit of area of bearing between the inner race and said roller.

2. A roller bearing having co-axial inner and outer races and a series of rollers interposed therebetween, the effective bearing surface of the outer race being less than the effective bearing surface of the inner race in a proportion such that the square of the stress momentarily transmitted per unit of length of effective bearing under load, parallel to said rollers, between the outer race and one of said rollers is at least equal to the square of the stress simultaneously transmitted per unit of length of bearing between the inner race and said roller.

3. A roller bearing having co-axial inner and outer races and a series of rollers interposed therebetween, the roller-bearing surface of the outer race being provided with interruptions of sufficient extent so that the square of the stress momentarily transmitted per unit of length between the outer race and one of said rollers is greater than the square of the stress simultaneously transmitted per unit of length between the inner race and said roller.

4. A roller bearing having co-axial inner and outer races and a series of rollers interposed therebetween, the roller bearing surface of the outer race in contact with the rollers being of a length in the axial direction which is less than the length of the bearing surface of the inner race, in the axial direction, by an amount which is so proportioned that the square of the stress momentarily transmitted per unit of length between the outer race and one of said rollers is greater than the square of the stress momentarily transmitted per unit of length between the inner race and said roller.

CHARLES ANTONY ABLETT.

REFERENCES CITED

The following references are of record in the file of this patent:

UNITED STATES PATENTS

| Number | Name | Date |
|---|---|---|
| 617,550 | Appel | Jan. 10, 1899 |
| 1,158,817 | Lockwood | Nov. 2, 1915 |
| 2,365,154 | Story | Dec. 19, 1944 |